United States Patent [19]

Frade et al.

[11] 4,110,815

[45] Aug. 29, 1978

[54] SOLID ELECTROLYTIC CAPACITOR

[75] Inventors: Gilbert Frade; Balint Escher; Dominique Prince, all of Paris, France

[73] Assignee: Societe Lignes Telegraphiques et Telephoniques, Paris, France

[21] Appl. No.: 727,429

[22] Filed: Sep. 28, 1976

[30] Foreign Application Priority Data

Oct. 6, 1975 [FR] France .................................. 75 30491

[51] Int. Cl.$^2$ ............................................. H01G 9/00
[52] U.S. Cl. ................................................... 361/433
[58] Field of Search .................. 317/230; 29/182, 570; 75/174; 361/433

[56] References Cited

U.S. PATENT DOCUMENTS

| 3,308,350 | 3/1967 | Smyth et al. | 317/230 |
| 3,320,500 | 5/1967 | Axelrod et al. | 317/258 |
| 3,461,355 | 8/1969 | Fry | 317/230 |
| 3,984,208 | 10/1976 | Moulin et al. | 29/182 |

Primary Examiner—Stanley D. Miller, Jr.
Assistant Examiner—James W. Davie
Attorney, Agent, or Firm—Carroll F. Palmer

[57] ABSTRACT

In solid tantalum electrolytic capacitors, an additive is introduced in the oxide dielectric layer consisting of an ion with a valency different from 5 in a concentration variable across the thickness of the layer. The nature of the additive is selected according to the characteristic to be improved.

8 Claims, 6 Drawing Figures

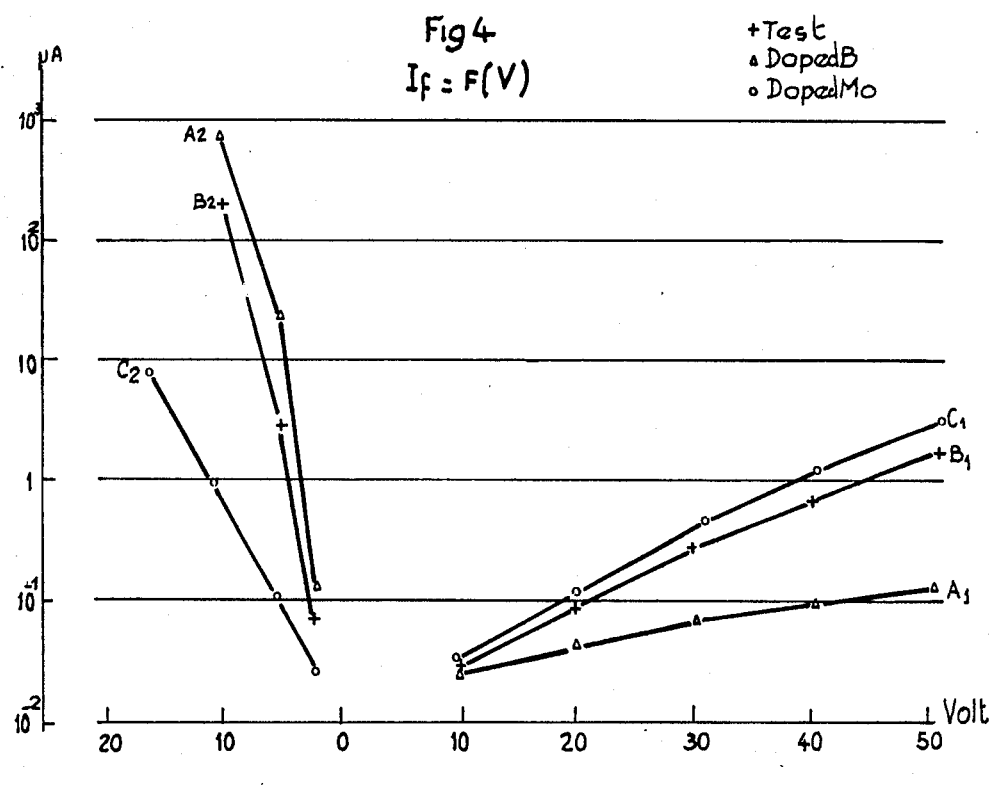
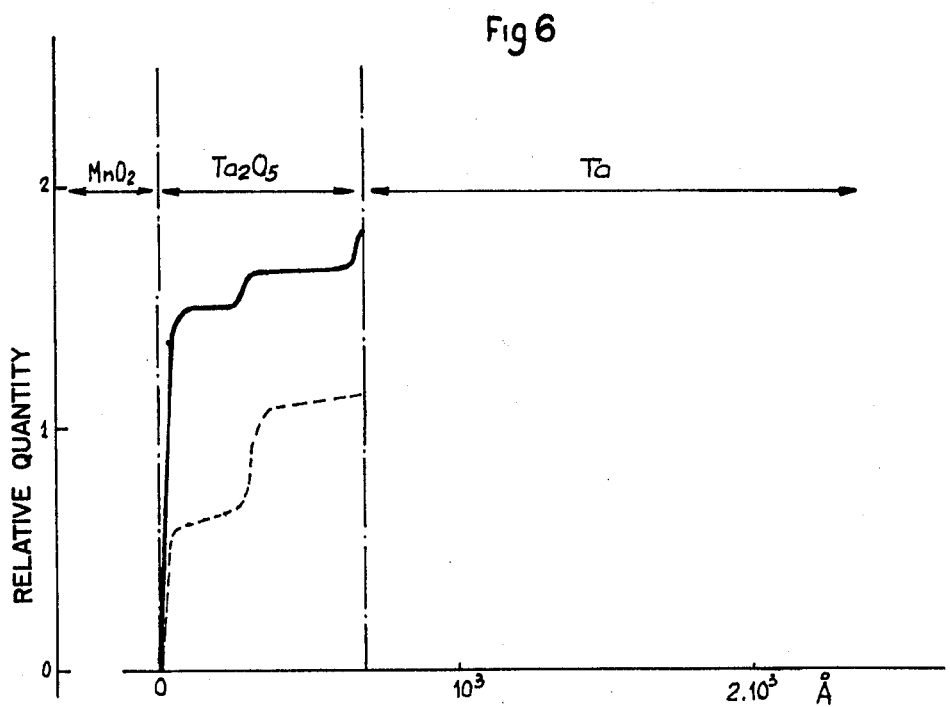

SOLID ELECTROLYTIC CAPACITOR

BACKGROUND OF THE INVENTION

The present invention concerns improvements in solid-electrolyte capacitors of the type described in U.S. Pat. No. 3,166,693 assignee to Western Electric Co and filed on April 2, 1953 for: "Dry electrolytic device". The commercial success of this type of capacitor is the best evidence of the interest which they may have for users. The users' requirements have become more specific in step with the technological advances made by the manufacturers of capacitors, and the performances demanded are therefore becoming increasingly difficult to achieve.

The present invention relates essentially to an improvement by which certain characteristics of the capacitor can meet the demand without detriment to the other characteristics. The expression "meet the demand" means that the choice of the characteristics affected by the improvement is made by the manufacturer in the course of the production in accordance with the request of the user. It is well known that, in some applications of capacitors, one particular characteristic thereof becomes preponderant. For example, some applications require maximum value of the reverse voltage of capacitors, while others require a minimum value of the leakage current or of the variation thereof as a function of temperature, and so on.

The present invention makes available to manufacturers of capacitors the means for modifying the characteristic which they desire to improve without modifying the other characteristics, and it is therefore of great interest on the industrial level, since it makes it possible to diversify the types of capacitors manufactured.

PRIOR ART

It has already been proposed to introduce additives into the tantalum constituting the anode, such additives being necessarily present in the oxide layer obtained through anodic oxidation of the anode. Reference is made more particularly to U.S. Pat. No. 3,984,208 and to the U.S. Application Ser. No. 665,287, applied for by the Applicants March 9, 1976, for: "Production of improved anodes for solid electrolyte capacitors". The present invention relates to the introduction, limited to the oxide layer, of an additive whose valence is different from that of oxidized tantalum, the additive concentration being variable as a function of the distance from the surface of the anode. In accordance with the nature of the additive and the law of introduction in the course of oxidation, it becomes possible to produce capacitors with improved performances without changing the process of manufacture.

BRIEF DESCRIPTION OF THE INVENTION

The present invention is essentially characterized in that, in the course of the stage of the anodic oxidation of the anode, an ionized additive is introduced, in accordance with a given law as a function of time, whose valence is different from that of oxidized tantalum, namely an additive whose valence is different from five. It is essential to the application of the invention that the introduction of the impurity into the oxide layer be so adjusted that the additive concentration in the oxide layer varies within the thickness of the layer.

The theoretical explanation of the modification of the properties of the capacitors according to the invention lies outside the scope of the present patent. However a simulated interpretation of the influence of the impurity in the oxide layer constituting the dielectric of the capacitor may be summarized as follows utilizing the elementary bases of solid-state physics. As is well known, monocrystalline dielectrics are characterized by a distribution of energy levels of electrons of the type illustrated in FIG. 1 (taken from the work "Electrons and Holes in Semiconductors" by W. Shockley, page 153, October 1955 Edition), in which the energy levels are plotted along the ordinates and the thickness along the abscissae. This diagram may be applied as a first approximation to the tantalum oxide of the capacitor. The valence band AB is saturated; above it is situated a forbidden zone BC of large width, which separates it from the conduction band CD, which is empty. In order that a valence band electron may pass into the conductive band, it is necessary to supply thereto the energy BC which corresponds to a value much higher than that due to thermal agitation and necessitates, for example, the application of an electric field whose value is much higher than that resulting from the normal operating voltage of the capacitor.

The introduction, in accordance with the present invention, of an ion having a valence which is different from that of oxidized tantalum into the oxide layer may be considered as producing substitutions of a number of tantalum ions by ions of the additive. This substitution results in the capture of a free electron and the trapping of a negative charge if the valence of the ionized additive is higher than five. This results in the build up of a free "hole" in the sense in which this term is employed in semiconductor physics. On the other hand, the substitution of a tantalum ion by an ion of lower valence results in the freeing of an electron and the build up of a fixed positive charge. The free carriers correspond to the introduction of new allowed quantum levels in the diagram of FIG. 1. By proper selections of the additive, an unsaturated band situated in the neighborhood of one of the ends of the forbidden band BC can be created. In the case of a hexavalent additive, the additional band is in the neighbourhood of the conduction band of the dielectric; in the case of an additive whose valence is lower than five, it is in the neighbourhood of the valence band. In both cases, the levels are chosen so that, under the stress of the electric field created by the operating voltage of the capacitor, the free carriers give rise to a current through the dielectric. It will be seen that, depending upon the nature of the free carriers, the carrier flow is added to or opposed to the leakage current of the capacitor. Likewise, the fixed charges resulting from the substitutions create an electric field which is in the same sense or opposed to that resulting from the operating voltage applied to the electrodes of the capacitor.

The assimilation of tantalum oxide to a crystal is a rough approximation. However, experience has shown that the phenomena observed agree, from the qualitative viewpoint, with the conclusions which may be drawn therefrom and that this model may serve as a guide for the manufacturer of capacitors.

FIG. 2 diagrammatically illustrates a tantalum capacitor consisting of a tantalum anode 1, a tantalum oxide dielectric layer 2 and a cathode 3 consisting of manganese dioxide and conductive layers 5 applied to the dioxide. It will be assumed that an hexavalent additive having different possible degrees of oxidation is introduced in the course of the oxidation of the tantalum.

The tantalum may be regarded as pentavalent under the normal conditions of oxidation. The additive tends to replace the pentavalent tantalum in the oxide. Under these conditions, the sixth valence electron of the additive does not participate in a covalent bond with a valence electron of an oxygen atom. It remains bound to the nucleus but less strongly than the others. In the case of forward biassing of the capacitor (FIG. 2), that is to say, when the tantalum is positive, the resultant electric field is sufficient to tear off these electrons, which follow the field towards the tantalum, as illustrated. They participate in the leakage current of the capacitor represented by the arrow i. The departure of these electrons sets up an electrical unbalance, the layer 4 being positively charged, whereby the electric field between the layer 4 and the tantalum anode is diminished; the electronic current tends to cancel out. The increase of the leakage current therefore remains small.

When the capacitor is reversely biased (cf. FIG. 3), the weakly bound electrons are repelled by the neighbouring tantalum and tend to accumulate at the interface of the layer 4 with the thick tantalum oxide, through which they cannot pass. There is created in the neighbourhood of the layer 4 a potential barrier which results in a reduction of the leakage current.

On the basis of the same type of model applied to an impurity having a valence lower than that of the oxidized tantalum, and located in the neighbourhood of the external zone of the dielectric, there may be foreseen a reduction of the leakage current in the forward direction. Experience has shown that it is accompanied by an increase in the stability of the leakage current as a function of temperature.

In the foregoing, no assumption has been made regarding the manner in which the additive should be introduced into the dielectric. Chemical methods (for example introduction into the electrolyte used for the oxidation) or physical methods (for example ionic implantation) by which this operation can be performed are known.

It is to be understood that the considerations briefly set out in the foregoing serve as a basis for the person skilled in the art to determine the nature and location of the additive in the layer of tantalum oxide as a function of the object aimed at, as well as the choice of the additive by comparison of the quantum levels.

BRIEF DESCRIPTION OF THE DRAWINGS

The invention will be readily understood from the following description and from the accompanying figures, which are given by way of non-limiting illustration, and in which:

FIGS. 4 and 5 are characteristic curves of capacitors according to the invention compared with characteristic curves of capacitors of the same type designed in accordance with the prior art, and FIG. 6 illustrates the variations of concentration in thickness.

DESCRIPTION OF THE PREFERRED EMBODIMENTS

Figure 1:
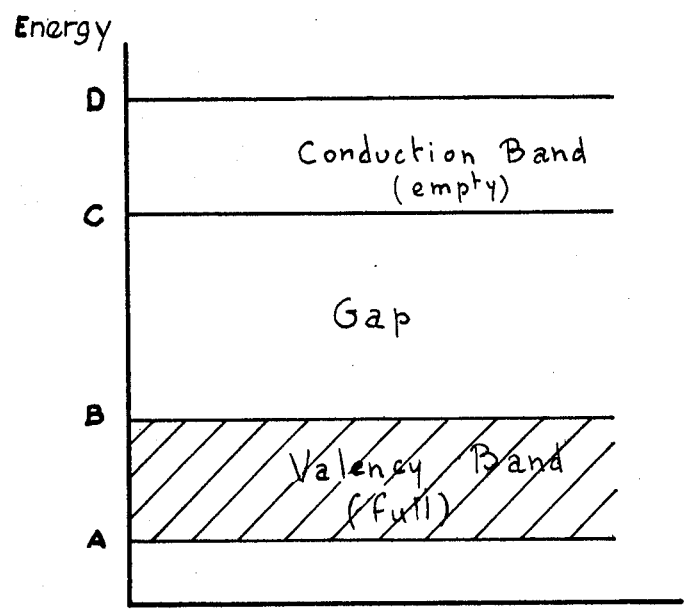
FIGS. 1, 2 and 3 are diagrams intended for an understanding of the invention.
Figure 2:
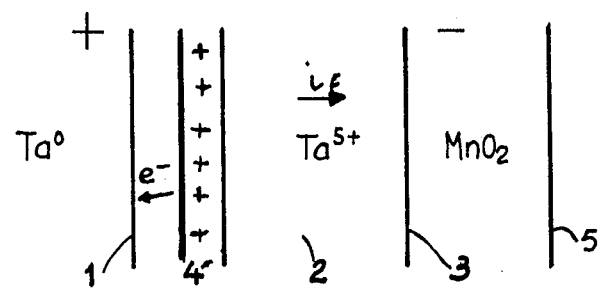
Figure 3:
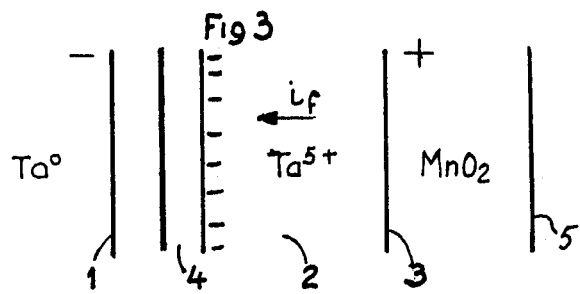

FIGS. 1, 2 and 3 have already been described in the foregoing.

The curves of FIG. 4 represent the variations of the leakage current of three series of capacitors operating with the direct bias (curves $A_1$, $B_1$, $C_1$) and with reverse bias ($A_2$, $B_2$, $C_2$). The curves $B_1$-$B_2$ represent the characteristics of capacitors whose dielectric is pure tantalum oxide; the curves $A_1$-$A_2$ represent the characteristics of capacitors whose dielectric incorporates boron (trivalent element performing the function of an acceptor) and the curves $C_1$-$C_2$ represent those of capacitors whose dielectric incorporates molybdenum (hexavalent element performing the function of donor). As will be apparent, at equal voltage, the forward leakage current of capacitors whose tantalum oxide contains boron is lower than that of capacitors with a pure dielectric. The capacitors whose dielectric comprises molybdenum are more symmetrical (higher forward leakage current and lower inverse leakage current) than capacitors having a pure dielectric.

The introduction of boron into the dielectric was effected in the following manner in the case of capacitors whose current-voltage characteristic curve is represented by $A_1$-$A_2$ in FIG. 4. The oxidation of the anode is effected, in the usual manner, in phosphoric acid medium ($H_3PO_4$ in solution in a concentration of $2.10^{-3}$ mol per liter) under constant current conditions up to a value greater than one-half of the forming voltage desired. The voltage is maintained constant for fifteen minutes and the current is then interrupted. A boric acid solution in a concentration of 10 grams per liter is added to the phosphoric acid solution in a proportion of 10 cubic centimeters per liter, which corresponds to a molar concentration of $1.6 \cdot 10^{-3}$ mol per liter of boron. The oxidation is continued under the preceding conditions until the forming voltage is reached.

Oxidations carried out with drying of the anodes between the two phases have also given good results. Boron may also be introduced into the oxidation electrolyte in the form of ammonium borate in solution in a concentration of 18 grammes per liter.

The boron concentration referred to by way of example has no limiting character. Oxidizing operations have been successfully carried out in such manner as to cover the range of one cubic centimeter to one-hundred cubic centimeters of boron-containing solution added to the phosphoric acid bath. The duration of the second phase of the oxidation depends upon the boron concentration. Of course, boron is not the only additive that can be used. Oxidations in the presence of molybdenum and aluminium have given the expected results, these two substances constituting no limitation.

Figure 5:
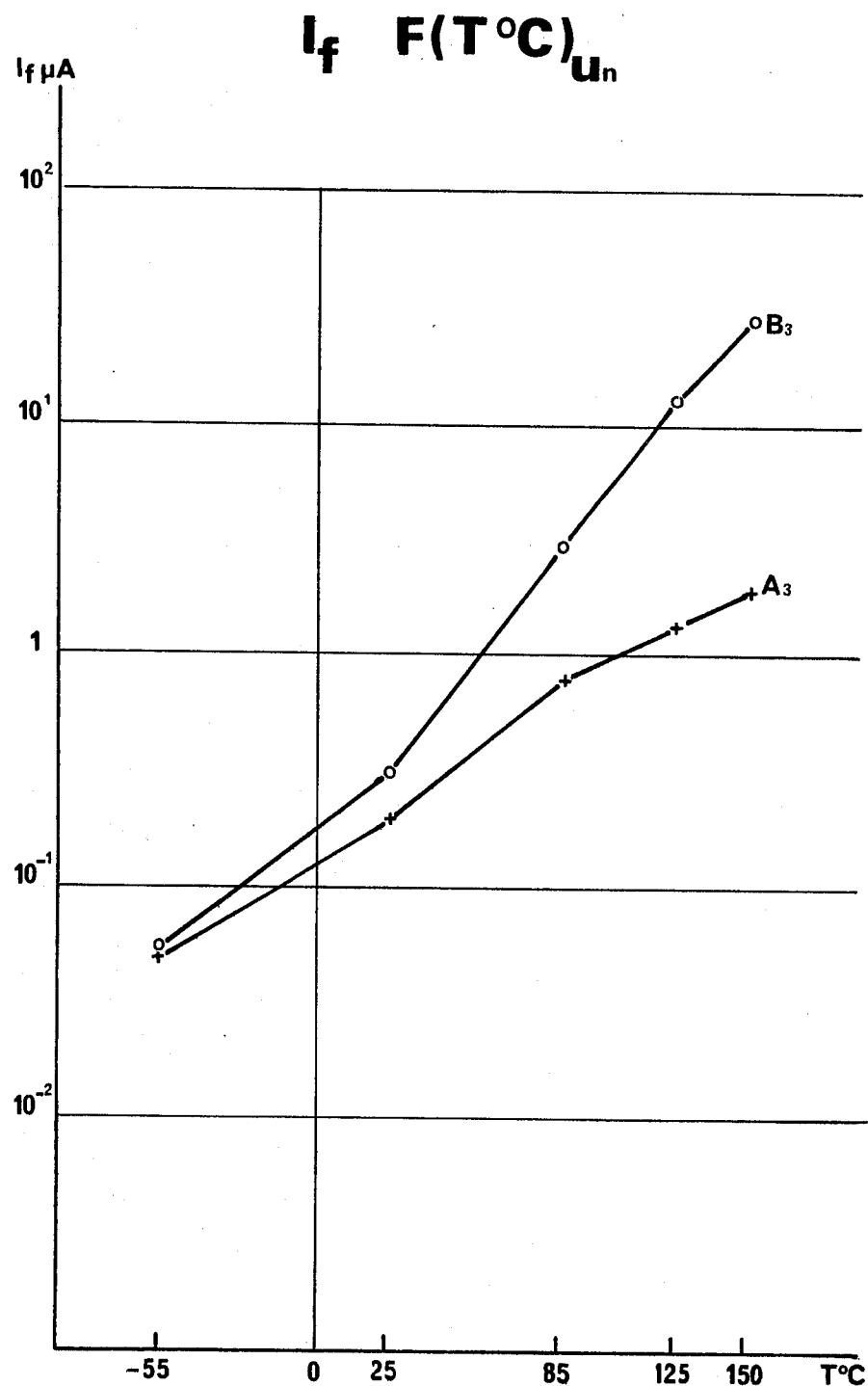

Curves $A_3$ and $B_3$ of FIG. 5 represent the variation of the leakage current as a function of the temperature of capacitors having pure dielectric ($B_3$) and dielectric containing boron ($A_3$) produced as stated in the foregoing. The measurements were made at the rated operating voltage of the capacitors.

The curve of FIG. 6 represents the variation of the molybdenum concentration in the tantalum oxide layer of capacitors having the characteristics $C_1$-$C_2$. The abscissae represent the distance from the external surface (cathode side) and the ordinates a relative quantity. The curve was plotted by means of an ionic probe. The chain-lined curve represents the molybdenum concentration and the solid-lined curve the tantalum concentration in the oxide layer. The scales of the two curves are very different. It will be observed that two levels of molybdenum concentration appear on the curve. The total thickness of the layer explored was about 700 A.

In the foregoing, there has been described an example in which the boron additive is introduced into the electrolyte serving for the anodic oxidation of the tantalum anode. It is to be understood that this example is given by way of non-limiting illustration and that any method known per se may be employed.

What we claim:

1. In a solid electrolyte capacitor made of a sintered tantalum anode, a dielectric consisting of a tantalum oxide layer obtained through anodic oxidation of said tantalum anode and a cathode comprising manganese dioxide which covers said tantalum oxide layer and a conductive layer deposited on said manganese dioxide, the improvement which comprises an impurity selected from the group consisting of trivalent impurities and hexavalent impurities distributed non-uniformly through the thickness of said tantalum oxide layer.

2. The capacitor of claim 1 wherein said impurity is introduced into said tantalum oxide layer by immersing said sintered tantalum anode in an acidic solution containing a small concentration of ions of a metal selected from the group consisting of boron, aluminum and molybdenum and electrically oxidizing a portion of said sintered tantalum anode while it is immersed in said acidic solution.

3. The capacitor of claim 1 wherein said dielectric layer of tantalum oxide is formed on particles of tantalum metal and the resulting oxide layer is subsequently covered with manganese dioxide and said impurity is introduced into said tantalum oxide layer after said tantalum oxide layer has been formed.

4. In a solid electrolyte capacitor made of a sintered tantalum anode, a dielectric consisting of a tantalum oxide layer grown through anodic oxidation of said anode, a cathode comprising manganese dioxide which covers said tantalum oxide layer and a conductive layer deposited on said manganese dioxide, the improvement which comprises an impurity that is hexavalent distributed non-uniformly through the thickness of said tantalum oxide layer with a maximum concentration proximal said anode.

5. The capacitor of claim 4 wherein said impurity is hexavalent molybdenum.

6. In a solid electrolyte capacitor made of a sintered tantalum anode, a dielectric consisting of a tantalum oxide layer grown through anodic oxidation of said anode, a cathode comprising manganese dioxide which covers said tantalum oxide layer and a conductive layer deposited on said manganese dioxide, the improvement which comprises an impurity that is trivalent distributed non-uniformly through the thickness of said tantalum oxide layer with a minimum concentration proximal said anode.

7. The capacitor of claim 6 wherein said impurity is trivalent boron.

8. The capacitor of claim 6 wherein said impurity is trivalent aluminum.

* * * * *